(12) United States Patent
Sumey et al.

(10) Patent No.: US 7,703,779 B2
(45) Date of Patent: Apr. 27, 2010

(54) SPINDLE COOLING DEVICE

(75) Inventors: Daniel J. Sumey, Uniontown, PA (US); Mark K. German, Uniontown, PA (US)

(73) Assignee: Ground Force Marketing, Inc., Mt. Braddock, PA (US)

( * ) Notice: Subject to any disclaimer, the term of this patent is extended or adjusted under 35 U.S.C. 154(b) by 0 days.

(21) Appl. No.: 12/145,791

(22) Filed: Jun. 25, 2008

(65) Prior Publication Data

US 2009/0001678 A1    Jan. 1, 2009

Related U.S. Application Data

(60) Provisional application No. 60/946,029, filed on Jun. 25, 2007.

(51) Int. Cl.
*B62D 7/18* (2006.01)

(52) U.S. Cl. .................................. 280/93.512

(58) Field of Classification Search ............. 280/93.512
See application file for complete search history.

(56) References Cited

U.S. PATENT DOCUMENTS

| 5,087,229 | A  | * | 2/1992  | Hewko et al. ............... 475/149 |
| 6,860,498 | B2 |   | 3/2005  | McGaughy |
| 6,962,357 | B2 |   | 11/2005 | McGaughy |
| 7,073,802 | B2 |   | 7/2006  | McGaughy |

* cited by examiner

*Primary Examiner*—Faye M. Fleming
(74) *Attorney, Agent, or Firm*—Alan G. Towner, Esq.; Pietragallo Gordon Alfano Bosick & Raspanti, LLP

(57) ABSTRACT

A spindle with cooling fins is disclosed. The spindle has raised cooling fins on an outside exterior surface. The fins create cooling channels which direct air upward when the vehicle is in motion. The redirected air passes over and around the brake and hub assemblies. This effectively dissipates heat from the brake and hub assemblies and will help to prevent overheating and premature failure of the parts.

16 Claims, 4 Drawing Sheets

SPINDLE COOLING DEVICE

CROSS-REFERENCE TO RELATED APPLICATION

This application claims the benefit of U.S. Provisional Application No. 60/946,029 filed Jun. 25, 2007, which is incorporated herein by reference.

FIELD OF THE INVENTION

The present invention relates to a steering knuckle for use on the front end of a vehicle.

BACKGROUND INFORMATION

A typical spindle or steering knuckle is a component of the front suspension of a vehicle, which attaches the wheel and brake assemblies to the vehicle, and allows the wheels to travel vertically, turn, and rotate. Mounted on the steering knuckle are brake assemblies and hub assemblies on which the wheels of the vehicle are mounted.

Braking generates heat which increases wear and may cause premature failure of the brake assemblies. Bearings within the hub assemblies are also prone to premature failure when overheating occurs. This problem is compounded when vehicles must operate in harsh conditions such as descending steep grades or operating in high temperature environments. Trucks are often at greatest risk to brake and wheel bearing overheating as they are required to slow or stop heavier loads.

The present invention has been developed in view of the foregoing.

BRIEF SUMMARY OF THE INVENTION

The present invention provides a spindle or knuckle with cooling fins. The knuckle has raised cooling fins on an outside exterior surface. The fins create cooling channels which direct air upward when the vehicle is in motion. The redirected air passes over and around the brake and hub assemblies. This effectively dissipates heat from the brake and hub assemblies and will help to prevent overheating and premature failure of the parts.

In certain respects, the present invention provides a steering knuckle for use on a vehicle suspension assembly comprising: a knuckle body having an interior face, an exterior face, a bore and at least one cooling fin on the exterior face, and at least a first ball joint boss extending from the knuckle body.

In other respects, the present invention provides a suspension assembly for a vehicle comprising a knuckle including body, an upper boss, a lower boss, a bore and an exterior surface having at least one cooling fin; a hub assembly seated within the bore of the knuckle; a wheel assembly attached to the hub assembly; an upper ball joint connecting an upper control arm to the upper boss, and a lower ball joint connecting a lower control arm to the lower boss.

In yet other respects, the present invention provides a method of cooling a brake assembly and a hub assembly of a vehicle comprising the steps of providing a knuckle having at least one fin which directs air towards the brake assembly and the hub assembly when the vehicle travels in forward direction, and causing the vehicle to move in a forward direction.

These and other aspects will become more apparent from the following description.

DETAILED DESCRIPTION

The present invention provides a steering knuckle with improved cooling for a hub assembly and brake assembly mounted on an exterior surface of the steering knuckle. When a vehicle with spindles of the present invention installed is in motion, the cooling fins of each spindle catch air and direct the flow of the air upward through the channels created by the cooling fins. This forced air travels around the wheel hub assembly, brake rotor, brake caliper and brake pad, effectively cooling this equipment by dissipating heat away from the spindle assembly. As a result, the aforementioned components last longer than components installed on a conventional spindle.

Figure 1:
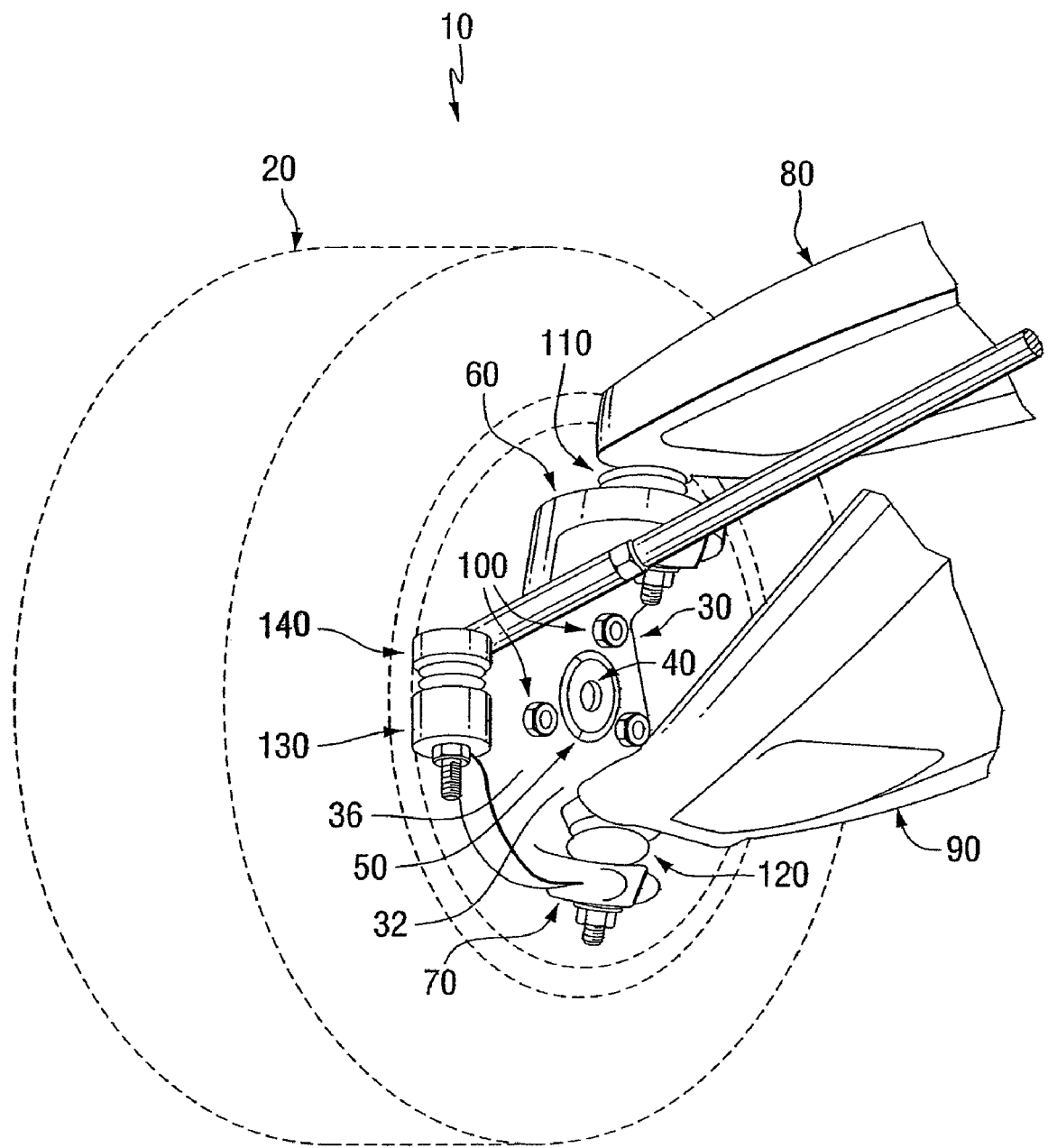
FIG. 1 is a perspective view of a suspension assembly of a vehicle.

Referring now to FIG. 1, a suspension assembly 10 of a vehicle is shown. As used herein, the term "vehicle" refers to a wheeled conveyance that transports people or objects including cars, trucks, vans and buses. FIG. 1 illustrates perspective view of the a suspension assembly 10 for a front end of a rear wheel drive vehicle showing the interior face 32 of the knuckle body 36. A tire/wheel assembly 20 is connected to the remainder of the suspension assembly 10 via a steering knuckle 30. As used herein, a "steering knuckle" or simply "knuckle" is a term that refers to a part of a vehicle suspension which connects a hub of a wheel to other components including, but not limited to, ball joints, a steering mechanism and a brake assembly. The hub assembly 40 of the tire/wheel assembly 20 passes through a bore 50 in the steering knuckle 30.

An upper ball joint boss 60 extends from a top portion of the steering knuckle 30 and connects to an upper control arm 80. Ball joint 110 is used to connect the upper ball joint boss to the upper control arm 80. In similar fashion, a lower ball joint boss 70 is connected to a lower control arm 90 with a lower ball joint 120. Hub assembly bolts 100 are used to fasten the hub assembly 40 to the body 36.

Extending from a forward portion of the body 36 is a steering arm 130. The steering arm connects to a tie rod 140 which moves to control the direction of the tire/wheel assembly 20.

Figure 2:
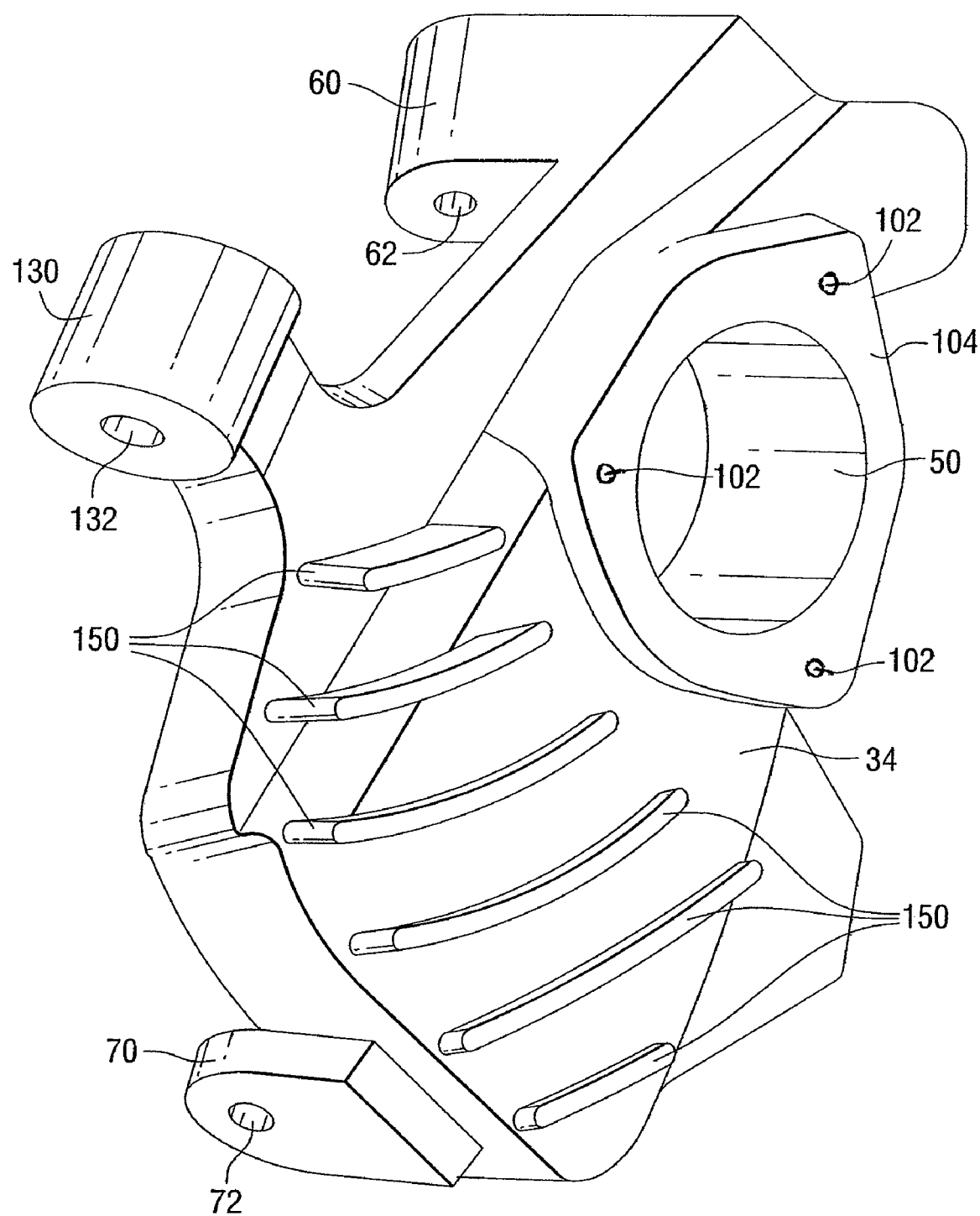
FIG. 2 is a perspective view of an exterior face and cooling fins of a steering knuckle according to one embodiment of the present invention.

FIG. 2 shows a perspective view of an exterior face 34 of the steering knuckle 30 according to one embodiment of the present invention. In FIG. 2, the steering knuckle 30 has been removed from the remainder of the suspension assembly 10. With other components removed, the mounting hole 132 for mounting a tie rod to the steering arm 130 can be seen. Similarly, mounting holes 62, 72 within the upper ball joint boss 60 and lower ball joint boss 70 respectively can be seen. Bolt holes 102 for the hub assembly bolts 100 may be located on the hub assembly 100 seating surface 104. The exterior surface 34 of the steering knuckle 30 is the outwardly facing portion of the knuckle 30 closest to the wheel. According to one embodiment of the present invention, the exterior surface 34 may have six raised cooling fins 150 projecting outwardly from the exterior surface 34. Although the embodiment shown in FIG. 2 shows six cooling fins 150, any number of cooling fins 150 may be used. When the steering knuckle 30 with cooling fins 150 is used on a vehicle and the vehicle travels in a forward direction, the cooling fins 150 direct air upwardly towards the hub assembly 100 and brake assembly (not shown). Although the brake assembly is not shown mounted onto the steering knuckle 30, one skilled in the art would appreciate the brake assembly including brake pads would mount onto the steering knuckle 30 and be configured to interact with a disc or drum on connected to the hub or wheel.

Figure 3:
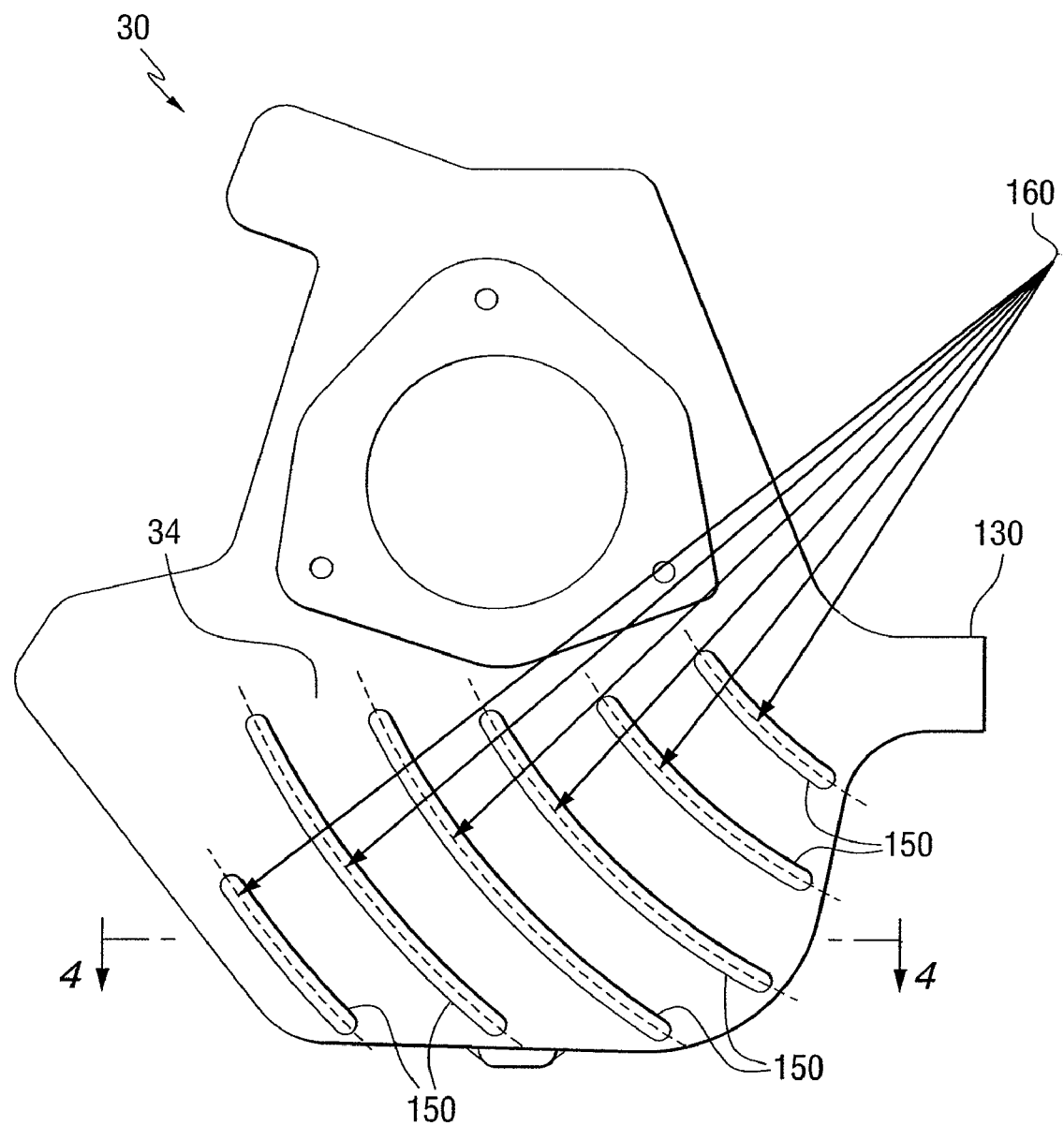
FIG. 3 is a front view of a spindle detailing the layout of the cooling fins according to one embodiment of the present invention.

FIG. 3 is a front view of the exterior surface 34 of the steering knuckle 30 according to one embodiment of the present invention. The cooling fins 150 may be concentrically arranged at varying radii about a common focal point 160. The radius of each cooling fin in FIG. 3 is indicated by a corresponding arrow extending from focal point 160. Radii may range from about 3 inches to about 30 inches, for example, 8 inches to 14 inches depending on location of the focal point 160 and size of the steering knuckle 30. Radial intervals of the cooling fins 150, i.e., the distance between each fin, may be any suitable dimension it should be appreciated that the steering knuckle 30 shown in FIG. 3 is designed to fit the right front wheel of a vehicle while the steering knuckle 30 shown in FIG. 2 is configured for the left front wheel of a vehicle.

Figure 4:
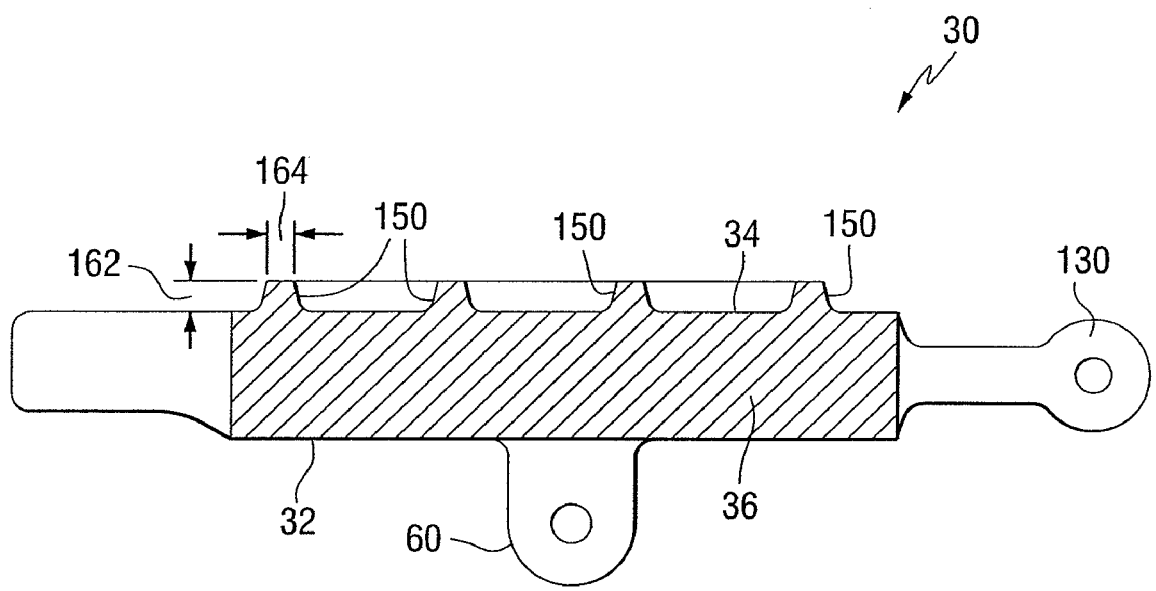
FIG. 4 is a cross section of the spindle of FIG. 3 along section line 4-4.

A section view of the steering knuckle of FIG. 3 along section line 4-4 is shown in FIG. 4 according to one embodiment of the present invention. The cooling fins 150 have a height 162 above the exterior face 34 of the steering knuckle 30. The height 162 is maximized to achieve the greatest amount of directional cooling while not interfering with other components such as the brake assembly, hub assembly and wheel. For most automobiles, a suitable height is about 0.1 inch to about 0.2 inch, for example, about 0.13 inch. As seen in FIG. 4, the cooling fins 150 also have a width 164. The width 164 is configured to provide structural integrity for the cooling fins 150 without impeding air flow unnecessarily. A suitable width for steering knuckles 30 used on automobiles is about 0.15 inch to about 0.3 inch, for example, 0.25 inch. Although the cooling fins 150 have radial or chamfered corners, the cooling fins may be any suitable shape.

While the above described configuration is considered effective an is the easiest to manufacture, other cooling fin configurations could be used to redirect air to the brake and hub assemblies as well. It is contemplated that a similar result could be achieved by raising the exterior face 34 and directing air through channels within the exterior face 34.

Whereas particular embodiments of this invention have been described above for purposes of illustration, it will be evident to those skilled in the art that numerous variations of the details of the present invention may be made without departing from the invention.

The invention claimed is:

1. A steering knuckle for use on a vehicle suspension assembly, comprising:
    a knuckle body having an interior face, an exterior face extending in a substantially vertical plane when installed on the vehicle, a bore and at least one cooling fin extending from the exterior face in a substantially horizontal direction;
    an upper ball joint boss extending from the knuckle body; and
    a lower ball joint boss extending from the knuckle body.

2. The steering knuckle of claim 1, further comprising a plurality of cooling fins.

3. The steering knuckle of claim 2, wherein at least one of the plurality of cooling fins has a height of 0.1 inch to about 0.2 inch.

4. The steering knuckle of claim 2, wherein at least one of the plurality of cooling fins has a height of 0.13 inch.

5. The steering knuckle of claim 2, wherein at least one of the plurality of cooling fins has a width of about 0.15 inch to about 0.3 inch.

6. The steering knuckle of claim 2, wherein at least one of the plurality of cooling fins has a height of about 0.25 inch.

7. The steering knuckle of claim 1, further comprising a steering arm extending from the knuckle body.

8. A suspension assembly for a vehicle, comprising:
    a knuckle including a body, an upper boss, a lower boss, a bore and an exterior surface having at least one cooling fin;
    a hub assembly seated within the bore of the knuckle;
    a wheel assembly attached to the hub assembly;
    an upper ball joint connecting an upper control arm to the upper boss; and
    a lower ball joint connecting a lower control arm to the lower boss.

9. The suspension assembly of claim 8, wherein the knuckle further comprises a plurality of cooling fins.

10. The suspension assembly of claim 9, wherein at least one of the plurality of cooling fins has a height of 0.1 inch to about 0.2 inch.

11. The suspension assembly of claim 9, wherein at least one of the plurality of cooling fins has a height of 0.13 inch.

12. The suspension assembly of claim 9, wherein at least one of the plurality of cooling fins has a width of about 0.15 inch to about 0.3 inch.

13. The suspension assembly of claim 9, wherein at least one of the plurality of cooling fins has a height of about 0.25 inch.

14. A method of cooling a brake assembly and a hub assembly of a vehicle comprising the steps of:
    providing a knuckle having at least one fin which directs air towards the brake assembly and the hub assembly when the vehicle travels in forward direction; and
    causing the vehicle to move in a forward direction.

15. The method of cooling a brake assembly and a hub assembly of a vehicle of claim 14, wherein the knuckle has a plurality of fins.

16. The method of cooling a brake assembly and a hub assembly of a vehicle of claim 15, wherein the plurality of fins all project from an exterior surface of the knuckle.

* * * * *